Feb. 4, 1964 H. N. PARKER 3,120,580
STEREO SIGNAL GENERATOR
Filed March 23, 1962
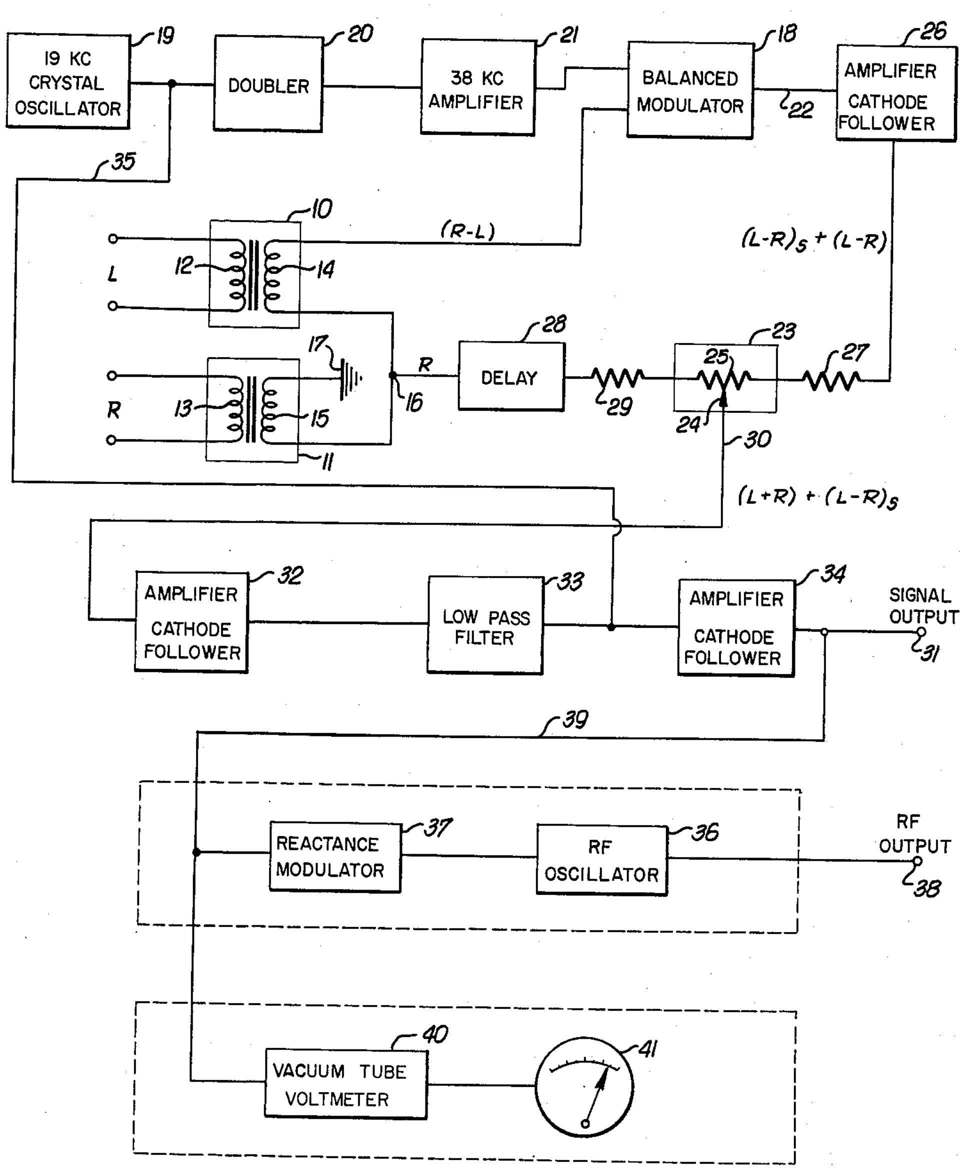
INVENTOR.
HAROLD N. PARKER
BY
Flam and Flam
ATTORNEYS.

3,120,580

STEREO SIGNAL GENERATOR

Harold N. Parker, North Hollywood, Calif., assignor to Calbest Engineering & Electronics Co., Los Angeles, Calif., a corporation of California Filed Mar. 23, 1962, Ser. No. 181,895
4 Claims. (Cl. 179—15)

This invention relates to a stereo signal generator for producing a composite signal of the type now specified by the Federal Communications Commission for stero multiplex broadcasting.

Conventionally, the symbols L and R represent the signals of the two source channels that are intended ultimately to be reproduced. In accordance with the FCC requirements:

(1) The main broadcast channel must carry information corresponding to the combined output of the two source channels so that conventional receivers continue to receive the monaural signal; and (2) Sidebands corresponding to an amplitude modulated 38 kc. subcarrier must also be present, the 38 kc. subcarrier modulation being produced by the combined output of the two channels, but in a relative phase relationship opposite to that in the main broadcast channel. The composite wave can be represented as:

$$(L+R)+(L-R)_s$$

where the subscript denotes sidebands of a suppressed carrier 38 kc. wave. The sidebands escape detection by the conventional receiver; but an adapter detects the component $(L-R)$ for use in recreating the L and R channels by alternate phase combinations with the component $(L+R)$. Thus $(L-R)+(L+R)=2L$ and $(L+R)-(L-R)=2R$.

The signal generator that is the subject matter of this application incorporates means for producing a radio frequency signal for modulation by the composite stereo signal for testing reception by a receiver. While the apparatus is intended primarily for use as an instrument for testing and adjusting FM stereo receivers and stero adapters, it is also usable as a generator for the transmission of stereo broadcast material.

Prior signal generators generally incorporate balanced modulators to which two signals are applied, the first being the audio component $(L-R)$ and the other being a 38 kc. sine wave. These prior modulators suppress both the carrier and the audio so that at the output, only the component $(L-R)_s$ is present. There are, however, difficulties.

In order to provide a balanced modulator that suppresses not only the carrier but also the audio frequency components, sections of a center tapped transformer, for example, must be exactly balanced throughout a frequency spectrum extending from the lowest audible frequency through frequencies above 38 kc. Without such precise balancing of audio components in the balanced modulator, audio signal seeps into the output and creates a third component $(L-R)_i$ where "*i*" denotes imbalance. This results in two errors. The first error is that before transmission, the audio component $(L-R)_i$ will before transmission combine with $(L+R)$ and distort the main channel for listeners using conventional apparatus. Finally, if the modulator is not exactly balanced, then there are imbalances upon attempted combinations of $$(L+R)+(L-R)_i\pm(L-R)$$

The desired separation or elimination of components cannot be achieved.

In order to avoid the expense of providing a transformer capable of perfect balanced operation throughout the lowest audible frequency to the highest side bands of the 38 kc. subcarrier, prior devices have used a band pass filter (23 kc.–53 kc.) at the output of a modulator balanced only as to the 38 kc. subcarrier for eliminating the audio component $(L-R)$. The very introduction of such a filter network requires that corresponding phase shifts or delay be introduced in the audio component $(L+R)$ which is to be directly applied to the transmitter, the purpose being to ensure that $(L+R)$ and $(L-R)$ can ultimately be arithmetically added together. This requires elaborate filter arrangements in two sections which must be precisely balanced.

The primary object of this invention is to make it possible to produce the requisite composite signal within the exacting specifications required by using a modulator balanced only as to the 38 kc. subcarrier, and yet without requiring any filter operating in conjunction with such balanced modulator. This is made possible by a new approach to the synthesis of a composite stereo signal. Thus if the modulator is balanced for subcarrier only, the output provides a signal corresponding to $(L-R)_s$ and $(L-R)$. To this signal there is added, in a resistant matrix, the audio signal corresponding to 2R whereby the required composite signal $(L-R)_s+(L+R)$ is produced. This requires a much simpler circuitry than heretofore believed possible.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a block diagram of a signal generator incorporating the present invention.

Two transformers 10 and 11 have primaries 12 and 13 which are driven by two stereo channels containing the signals L and R respectively. These channels may be simply microphones, or the output of a tape recorder or the like. When the apparatus is used for testing purposes, the signals for the respective channels may be pure sine waves.

The transformers 10 and 11 have secondaries 14 and 15, two ends of the respective secondaries 14 and 15 being tied together at terminal 16. The opposite terminal of winding 15 remote from the common terminal 16 is connected to ground 17. Hence at the terminal 16 a signal is provided that corresponds to R. At the side of the secondary winding 14 remote from terminal 16, a signal exists that corresponds to the algebraic sum of the outputs of the transformer windings 14 and 15. The windings are so arranged that the sum is $(R-L)$.

The signal $(R-L)$ is applied to a balanced modulator 18, as is a 38 kc. carrier, the 38 kc. carrier being intended for use as a subcarrier of a radio output. The 38 kc. subcarrier is generated by the combination of a 19 kc. crystal oscillator 19 and a frequency doubler 20. Thus the oscillator 19 drives the doubler 20 which in turn is applied to the balanced modulator 18 as indicated. An amplifier 21 for the 38 kc. subcarrier is provided.

The balanced modulator 18 is of a type which suppresses the 38 kc. subcarrier but which allows the passage of the modulating wave in its original form. The modulator may be of the type, for example, illustrated at FIG. (*a*) on page 381 of volume 21 of Electronic Instruments MIT Radiation Laboratory Series published by McGraw-Hill in 1948.

The modulator 18 has an output as indicated by lead or line 22 at which the signal corresponding to $(R-L)_s$ plus (R—L). This signal is inverted in phase and then combined with the signal 2R which is derived directly from the common terminal 16. The combination is achieved by the use of a potentiometer 23 having a slider 24. The balanced modulator output is connected to one side of the potentiometer resistor 25, through an isolating cathode follower and amplifier 26 that introduces the phase inversion, and a fixed limiting resistor 27. A circuit from common terminal 16 to the other side of the potentiometer resistor 25 is established through a liner delay network 28 and a fixed limiting resistor 29. By moving the slider 24, the appropriate proportion of signal is achieved such that at the slider lead 30, the requisite composite signal exists of the form $(R+L)+(L-R)_s$. Circuits which are fed or driven by the signal at the lead 30 equally affect all components as to amplitude and delay. Hence, after combination at lead 30, amplitude and phase balancing is no longer a problem.

The lead 30 connects with a composite output terminal 31 via an isolating cathode follower 32, a low pass filter 33 and another isolating cathode follower amplifier 34. The low pass filter 33 eliminates all frequencies above about 60 kc. in order to restrict the information to a band that corresponds in width to what may be available for radio broadcast.

The delay network 28 is a simple device that compensates for the difference between alternate paths from terminal 16 to lead 30. The circuitry may require only two, three or four microseconds of delay. In many instances, by proper design of the circuits elements in the respective paths or branches, a delay network may not actually be necessary.

In practice, a 19 kc. pilot signal is utilized in order to provide a synchronizing signal for re-creation of the suppressed carrier at the receiver. It is for this reason that the required 38 kc. subcarrier wave is generated by doubling the output of the 19 kc. crystal oscillator 19. A lead 35 from the oscillator 19 is connected ahead of the cathode follower 34, so that the pilot signal appears at the output terminal 31.

Equipment also utilizes a radio frequency oscillator 36, and a reactance modulator 37, in order to provide an RF output at a terminal 38, modulated by the composite stereo signal. Thus a lead 39 extends from the composite output terminal 31 to the reactance modulator 37, which in turn cooperates with the radio frequency oscillator 36. In actual practice, the reactance modulator 37 and RF oscillator 36 together with suitable power amplifiers may constitute the actual transmitter of an FM broadcast station.

The equipment furthermore includes a vacuum tube voltmeter 40 having, for example, a visible dial 41. The voltmeter 40 is connected to the composite output terminal 31.

The inventor claims:

1. In a stereo signal generator cooperable with two audio channels for two stereo signals L and R: circuit means for deriving from said channels, a composite signal corresponding to the algebraic sum of L and R, whether differential or cumulative; means for producing a subcarrier for modulation by said composite signal; a modulator cooperable with the subcarrier and the said composite signals for producing sidebands of said subcarrier as well as for passing said composite signals; means for producing a signal from one of said audio channels corresponding to twice one of the components of said composite signal, and of opposite phase; and means for combining the output of said modulator with the signal of said signal producing means.

2. In a stereo signal generator cooperable with two audio channels for two stereo signals L and R: circuit means for deriving from said channels, a composite signal corresponding to the algebraic sum of L and R, whether differential or cumulative; means for producing a subcarrier for modulation by said composite signal; a modulator cooperable with the subcarrier and the said composite signals for producing sidebands of said subcarrier as well as for passing said composite signals; a resistor having a slider engageable with selected intermediate portions of the resistor; means connecting one end of the resistor to the output of the modulator; and means connecting the other end of the resistor to one of said audio channels so that the phase of the stereo signal thereto applied is opposite in phase to that of the corresponding component of said composite signal; the slider being adjustable so that the components of the resultant audio signal are of a relative phase opposite to that of said composite signal.

3. In a stereo signal generator cooperable with two audio channels for two stereo signals L and R: two transformer secondary windings in which companion stereo signals are respectively produced; circuit means connecting the windings so that two singals are available, one composite signal corresponding to the algebraic sum of the signals L and R, whether differential or cumulative, and the other corresponding to one of the stereo signals alone; a modulator balanced as to carrier and driven by said composite signal to produce at the output thereof in addition to the composite signal itself, sidebands of a modulated carrier; a cathode follower amplifier driven by the output of the balanced modulator, and introducing a 180° phase shift so that the composite signal has a component corresponding to said one stereo signal, but of opposite phase; a resistance matrix, including adjustable proportioning means, for combining the said one stereo signal with the output of said cathode follower amplifier to produce a signal suitable for stereo multiplex broadcast.

4. The combination as set forth in claim 3 together with time delay means associated with said one stereo signal to ensure algebraic addition by said resistance matrix.

No references cited.